May 30, 1933.  E. H. HEDSTROM ET AL  1,912,036
METHOD OF DETERMINING THE DIRECTION OF ALTERNATING GROUND FIELDS
Filed Aug. 2, 1929
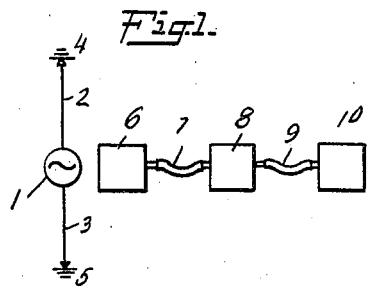
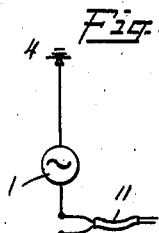
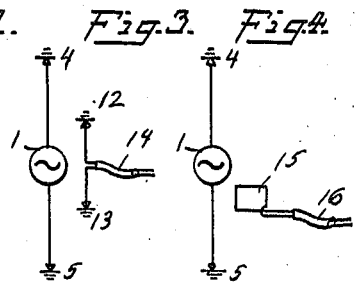
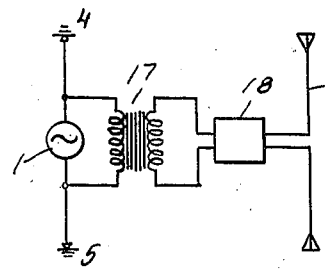
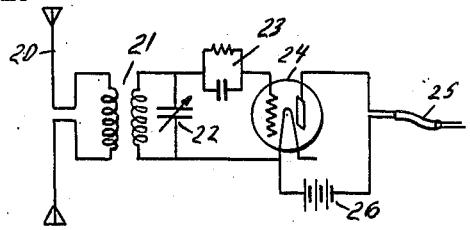
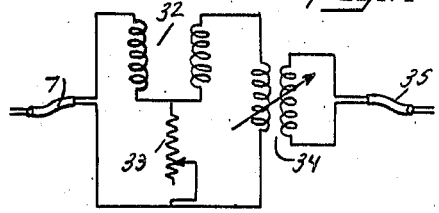
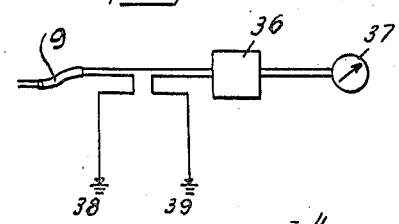
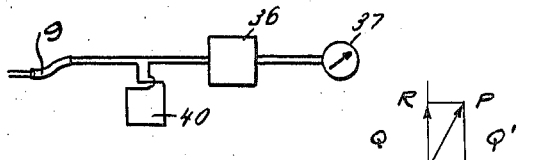
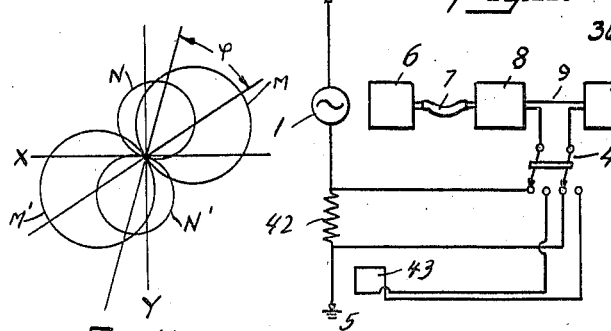
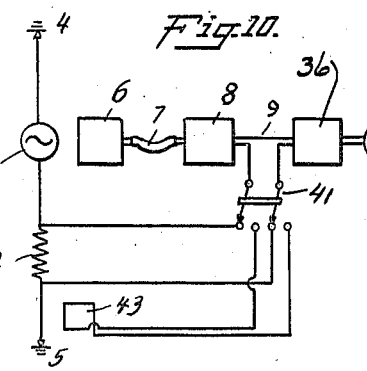
INVENTOR
E. Helmer Hedstrom
Theodor Zuschlag
BY
ATTORNEYS Patented May 30, 1933

1,912,036

UNITED STATES PATENT OFFICE

ERIK HELMER HEDSTROM, OF HOUSTON, TEXAS, AND THEODOR ZUSCHLAG, OF NEW YORK, N. Y., ASSIGNORS TO SWEDISH AMERICAN PROSPECTING CORPORATION, OF NEW YORK, N. Y., A CORPORATION OF NEW YORK

METHOD OF DETERMINING THE DIRECTION OF ALTERNATING GROUND FIELDS

Application filed August 2, 1929. Serial No. 383,133.

This invention relates to electrical prospecting. More particularly, it relates to electrical prospecting by means of artificially induced alternating current ground fields, and has for its object the provision of a method and apparatus enabling the attainment of various new and improved results.

It is generally well recognized that in the use of artificially induced alternating current ground fields, as in the plotting of equipotential lines with the help of two search electrodes and in the determination of field strengths by means of a search coil or search frame, the determination of the field direction is a particularly difficult matter because the field intensities rotate in time as well as in space and thereby cause so-called "dull minima" which make it almost impossible to determine the directions of minimum field strength in arbitrary planes.

In order to be scientifically correct, any method of investigating alternating current ground fields must take into consideration the rotating character of these fields and utilize apparatus designed in accordance with the complex problems involved. One practical method which has been widey used is based upon the use of compensating devices, with the help of which it is possible to determine the amplitude and phase relations of such alternating current fields. However, this method has the disadvantage that it requires a knowledge of the frequency of the exciter current producing the excited field used to induce the ground fields, and also entails rather complicated mathematical computations before the final results can be obtained.

It is the object of the present invention to avoid these disadvantages and at the same time provide a method and apparatus whereby any one versed in the art of electrical prospecting may carry out direction determinations for alternating current fields with practically the same ease and facility as for continuous or direct current fields.

To this end the present invention combines the use of compensating devices with standard electric or electromagnetic field direction determinations. It relies for its basis upon the fact that every transient alternating field potential or field intensity, with regard to a given space point and a given space component, can be considered as made up of two time components: one component in phase with the current of the exciter circuit producing the resultant field, called the "in phase component", and one component lagging 90° behind the phase of such exciter current and called the "out of phase component". This definition evidently determines the phase relation between potential or field intensity and exciter current with regard to an arbitrary space component. On the other hand, the two time components may and normally do differ not only with regard to different space points but also with regard to different space components relating to the same space point. This fact causes a rotation of the potential in time and of the field intensity in time and space. It follows that, under such conditions, the use of "direct current" methods in plotting equipotential lines or field directions must result in vague determination only, because at no moment or in no direction will the resultant potential drop or the resultant field strengths be zero and the employed indicator, at best, will show only a dull minimum. Yet this condition may be remedied if, simultaneously with a direction determination, either one of the two time components be neutralized by introducing an auxiliary component of the same phase and amplitude as the component to be neutralized. Such determination of direction refers, of course, to the remaining time component only; yet may be carried out with ease and accuracy without requiring additional computation. If the "in phase component", as is customary, be identified with potential and field intensity resultant from galvanic excitation and the "out of phase" component with potential and field intensity resultant from inductive excitation, then it is evident that a study of the direction of either one or both of the two components will furnish related yet different data regarding the resistivity configuration of the sub-surface.

Considering the invention more specifically, the exciter field may be generated in any of the various ways at present known, as for instance by means of an exciter cable connected to two grounded electrodes or by means of a closed loop of large diameter. Within the range of the exciter field thus set up is arranged an auxiliary field pick up device connected to a field neutralization device, the latter being in turn connected to an indicating and direction finding device. Depending on the particular conditions under which the direction determinations are to be made, the pick up device and also the neutralization device may take any one of various forms capable of effecting the neutralization of either the in phase or the out of phase components of the field being investigated.

For a better understanding of the invention, reference is made to the accompanying drawing wherein is illustrated in somewhat diagrammatic form apparatus which may be used in carrying out direction determinations in accordance with the herein disclosed method.

In the drawing:

Fig. 1 illustrates diagrammatically pick-up, neutralization and direction finding devices in accordance with the invention used in conjunction with a typical form of exciter circuit.

Figs. 2—5 illustrate various forms of a pick-up device which may be used.

Figs. 6 and 7 illustrate two forms of a neutralization device which may be used.

Figs. 8 and 9 illustrate two forms of a direction finding device which may be used.

Fig. 10 is a circuit diagram illustrating the manner in which the apparatus is balanced for actual operation.

Fig. 11 is a diagrammatic illustration of variations of potential or intensity with reference to two different space points or space components; and Fig. 12 is a vectorial illustration of a compensation procedure when using the apparatus of Fig. 8.

Considering the drawing more in detail in connection with the embodiment of the invention shown therein, Fig. 1 shows a typical form of exciter circuit comprising a suitable current source 1 connected by cables 2 and 3 to ground electrodes 4 and 5. It will be appreciated, of course, that the exciter circuit may be constituted by a closed loop of large diameter. Both forms of exciter circuit are old and well known. The form shown in the drawing is used merely for purposes of simplicity and is intended to be typical.

Within the range of the alternating field set up by the exciter circuit is arranged an auxiliary field pick-up device 6 connected by means of a double conductor cable 7 to a neutralization device 8, which, in turn, is connected by a double conductor cable 9 to a direction finding and indicating device 10.

With the arrangement shown, the auxiliary field picked up by the device 6 is used by means of the device 8 to neutralize either the real or imaginary component of the strength of the alternating ground field being investigated. The direction of the remaining component is then determined by means of the device 10.

The pick-up device may take any number of different forms; several of the more important are shown in Figs. 2–5. In Fig. 2, the device is constituted by a direct coupling arrangement consisting of a double conductor cable 11 connected in series with the exciter circuit. Fig. 3 illustrates a form of the pick-up device 6 wherein ground coupling is employed, the pick up being effected through the use of two ground electrodes 12 and 13 connected to a double conductor cable 14. Fig. 4, on the other hand, shows an electromagnetic coupling arrangement employing a feed coil 15 connected to a double conductor cable 16. In each case, the cables 11, 14 and 16, respectively, lead to the neutralization device 8.

A more complicated and also a preferred arrangement for practical purposes is shown in Fig. 5. In this instance, pick up is effected through a carrier wave coupling system including a high frequency transmitter composed of the elements 17, 18 and 19, and a high frequency receiver and detector comprising the elements 20—27 inclusive. The primary of the modulation transformer 17 is connected to the exciter circuit and the secondary is connected to the transmitter 18 so as to modulate its high frequency oscillations. The resulting modulated carrier wave is sent out over the antenna system 19. From the antenna 19 the carrier wave passes to the receiving antenna 20 and antenna coupler 21, the secondary of which is tuned to the carrier wave frequency by means of a variable condenser 22. The carrier wave is then demodulated and amplified by means of the grid leak, grid condenser arrangement 23 and detector tube 24, the low frequency of the exciter circuit being thereby sent out to the neutralization device 8 over a double conductor cable 25 connected across the plate of the tube and the B battery 26. Of course, the carrier wave system here described may be varied in many details but its general purpose and function should be the same as that of the circuit shown.

The auxiliary field after being picked-up by the device 6 passes to the neutralization device 8, which also may take various forms but consists principally of either a potentiometer or a variometer arrangement. If direct coupling as shown in Fig. 2 is used, it can readily be seen that by means of a potentiometer all field components in phase with the exciter current may be neutralized, and that by means of a variometer all field components lagging 90° behind the phase of the exciter current may be eliminated.

When using ground contact, electromagnetic or carrier wave coupling, however, it cannot be expected to obtain auxiliary field E. M. F.'s in phase with the in phase and out of phase field components by the use of a potentiometer or variometer, and accordingly a special phase changing arrangement in connection with the potentiometer or variometer is necessary in order to provide the proper phase relations.

Such phase changing arrangements may be made up in various combinations. Figs. 6 and 7 illustrate two different types of neutralization devices which can be employed for the purposes of the present invention.

According to the embodiment shown in Fig. 6, one lead from the pick-up device is connected through an inductance 27 to one end of a potentiometer 28 and the other lead is connected through a variable condenser 29 to the other end of the potentiometer. To the center point of the potentiometer and to its slider 30 are connected the ends of a double conductor cable 31 leading to the direction finding device 10. By adjusting the condenser 29 it is possible to change the phase of the potential drop across the potentiometer 28 from a lagging to a leading value and by varying the position of the slider 30 the amplitude of the potential drop between the center point and the slider can be varied between zero and a positive or negative maximum.

In Fig. 7, a slightly different arrangement is shown. In this instance, the leads from the pick-up device are connected one to the primary of a transformer 32 and the other to one end of a variable resistance 33. The primary and secondary of the transformer are connected in series and to their common point the other end of the resistance 33 is connected. In series with the secondary of the transformer 32 and the resistance 33 is arranged the primary of a variometer 34, the secondary of which is connected to a double conductor cable 35 leading to the direction finding device 10. By varying the resistance 33 from zero to infinity it is possible to change the phase of the current flowing through the primary of the variometer 34 from a leading to a lagging value, at the same time that the amplitude of the E. M. F. in the secondary of the variometer 34 is varied between zero and a positive or negative maximum.

Two forms of the direction finding device are shown in Figs. 8 and 9. In both figures, one of the leads from the neutralization is connected directly to the input of a low frequency amplifier 36, the output being connected to a suitable indicator 37. The other of the leads likewise is connected to the amplifier 36 but its circuit includes either ground electrodes 38 and 39, as shown in Fig. 8, or a search coil 40, as shown in Fig. 9. By moving one of the electrodes 38 or 39 or changing the position of the search coil 40, at the same time adjusting the variometer or potentiometer of the neutralization device, it is possible to obtain a perfect zero reading on the indicator 37 for certain positions of the electrodes or the search coil.

In order to explain this procedure in detail, reference is made to Fig. 11, where the two co-ordinates $x$ and $y$ represent the in-phase and out-of-phase time components with regard to the two arbitrary space points or perpendicular space components M and N. The circles M, M' and N, N' illustrate the potential or field intensity variations at the two space points or for the two space components during one cycle of alternation. Grounding electrodes 38 and 39 at the two space points M and N or placing a search coil 40 into the plane M N, it is evident that at no moment will the resultant E. M. F. be zero. This condition can only occur when the phase displacement $\phi$ between the two potentials or intensities decreases to zero. On the other hand, any change in the position of either one of electrodes 38 and 39 or in the position of search coil 40 will change the phase displacement as well as the diameter of either one or both data systems.

Now, assuming that one of the electrodes or the direction of the search coils is shifted until the out-of-phase components are identical or, in other words, nullify each other, then it is possible to compensate the remaining in-phase component by means of the neutralizing devices of Fig. 6 or Fig. 7, as indicated in Fig. 12. Let O P and O P' represent the resultant potential or field intensity for space points or space components M and N. Their out-of-phase components R and R' are identical and compensate each other, while the remaining in-phase component O Q is balanced out by the component O Q' of the neutralizing device, which of course must have been previously adjusted for in-phase compensation. The same, of course, is true with relation to neutralization of the in-phase component by shifting one of the search electrodes or the position of the search coil and balancing out the remaining phase component by means of the neutralizing devices previously adjusted for out-of-phase compensation.

The positions of the electrodes, thus found, are located upon a line of equal potential for the component of the electric ground field not neutralized by the auxiliary E. M. F. of the balancing device, while the plane of the search coil indicates the direction of the component of the electromagnetic ground field not neutralized by the balancing device.

However, before actual investigations can be performed by means of the apparatus above described, it is necessary to adjust the phase of the neutralization device 8. This adjustment is carried out by the use of a testing circuit such as that shown in Fig. 10.

In this figure the exciter circuit, pick-up, neutralizing and direction finding devices are connected up as shown in Fig. 1, while cable 9 is now connected to the amplifying and indicating devices 36 and 37 of Figs. 8 and 9. One lead of cable 9 is broken and connected to the center of a double pole double throw switch 41. One side of the switch 41 is connected to a variable low ohmic resistance 42 in series with the exciter circuit and the other side is connected to a rotatable pick-up coil 43 placed very close to the exciter cable.

If the switch 41 be thrown so as to connect in the resistance 42 and the potentiometer or variometer and the phase changing circuit of the neutralization device as well as resistance 42 be then adjusted until the indicator of the device 10 shows a zero reading, the phase of the neutralization device will be in phase with the exciter current, while it will lag 90° if the adjustment be carried out with the switch 41 thrown to connect in the rotatable pick-up coil 43.

With the pick-up device constituted as in Figs. 3 or 4 and the frequency of the exciter circuit constant, the phase adjustment obtained with the test circuit will remain the same as long as the electrodes 12 and 13 or the feed coil 15 remain at the same location. With the carrier wave coupling arrangement shown in Fig. 5, on the other hand, the phase adjustment will remain practically the same for any location of the receiving circuit 20—26 as long as the ratio between the low frequency of the exciter circuit and the high frequency of the transmitter 18 is more than 1:1000.

After the phase has once been adjusted it is a comparatively simple matter to carry out the direction determinations as previously described, keeping in mind that the designations in phase and out of phase applied to the components of the field strength have to be reversed when using the feed coil 15 instead of the electrodes 12 and 13. The complete direction distribution of the different field components and the interpretation of their variations in accordance with the established rules for electrical prospecting is then but a matter of repeating the direction determinations in a systematic way at various locations.

The different forms of auxiliary field pick-up and neutralization devices illustrated in the drawing are interchangeable for the purposes of the present invention. The particular selection made depends upon the individual requirements of each investigation. It may be mentioned that the herein described neutralization method may also be used in connection with methods of field strength ratio determinations based on direction investigations, as for instance the two frame method described in U. S. Patent No. 1,678,489.

We claim:

1. In a method of geo-electrical prospecting, the steps which comprise artificially inducing an alternating ground field current in a tract to be investigated by an exciter current adapted to provide a component in phase with the current of said exciter circuit and a component lagging 90° behind the phase of said exciter current, and neutralizing one of said components in the ground field by introducing an auxiliary field of the same amplitude and phase as the component to be neutralized.

2. In a method of geo-electrical prospecting, the steps which comprise artificially inducing an alternating ground field current in a tract to be investigated by an exciter current adapted to provide a component in phase with the current of said exciter circuit and a component lagging 90° behind the phase of said exciter current, and neutralizing said in phase component in the ground field by introducing an auxiliary field of the same amplitude and phase as the component to be neutralized.

3. In a method of geo-electrical prospecting, the steps which comprise artificially inducing an alternating ground field current in a tract to be investigated by an exciter current adapted to provide a component in phase with the current of said exciter circuit and a component lagging 90° behind the phase of said exciter current, and neutralizing said lagging component in the ground field by introducing an auxiliary field of the same amplitude and phase as the component to be neutralized.

4. In a method of geo-electrical prospecting, the steps which comprise artificially inducing an alternating ground field current in a tract to be investigated by an exciter current adapted to provide a component in phase with the current of said exciter circuit and a component lagging 90° behind the phase of said exciter current, neutralizing one of said components in the ground field by introducing an auxiliary field of the same amplitude and phase as the component to be neutralized, and determining the direction of the other component.

5. In a method of geo-electrical prospecting, the steps which comprise artificially inducing an alternating ground field current in a tract to be investigated by an exciter current adapted to provide a component in phase with the current of said exciter circuit and a component lagging 90° behind the phase of said exciter current, neutralizing said in phase component in the ground field by introducing an auxiliary field of the same amplitude and phase as the component to be neutralized, and determining the direction of the other component.

6. In a method of geo-electrical prospecting, the steps which comprise artificially inducing an alternating ground field current in a tract to be investigated by an exciter current adapted to provide a component in phase with the current of said exciter circuit and a component lagging 90° behind the phase of said exciter current, neutralizing said lagging component in the ground field by introducing an auxiliary field of the same amplitude and phase as the component to be neutralized, and determining the direction of the other component.

7. In a method of geo-electrical prospecting the steps which comprise inducing an alternating ground field in a tract to be investigated by an exciter current adapted to provide a component in phase with the current of the exciter circuit and a component out of phase with the current of the exciter circuit, then neutralizing either of said components by introducing an auxiliary field of the same amplitude and phase as the component to be neutralized, and then determining the direction of the other component of said field.

8. In a method of geo-electrical prospecting the steps which comprise inducing an alternating ground field in a tract to be investigated adapted to provide a component in phase with the current of the exciter circuit as well as a component 90° out of phase with the exciter circuit, neutralizing the component which is in phase with the exciter current by introducing an auxiliary field of the same amplitude and phase, and determining the direction of the component which is 90° out of phase with the exciter current.

9. In a method of geo-electrical prospecting the steps which comprise inducing an alternating ground field in a tract to be investigated adapted to provide a component in phase with the current of the exciter circuit as well as a component 90° out of phase with the exciter circuit, neutralizing the component which is 90° out of phase with the exciter current, and determining the direction of the component which is in phase with the exciter current.

In testimony whereof we affix our signatures.

E. HELMER HEDSTROM.
THEODOR ZUSCHLAG.